(12) United States Patent
Lenormand et al.

(10) Patent No.: US 6,844,743 B2
(45) Date of Patent: Jan. 18, 2005

(54) CAPACITIVE PROBE FOR MEASURING THE LEVEL OF AN ELECTRICITY-CONDUCTING LIQUID IN A VESSEL AND METHOD OF MANUFACTURING SUCH A PROBE

(75) Inventors: Roland Lenormand, Rueil Malmaison (FR); Christophe Chaput, Limoges (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 4 days.

(21) Appl. No.: 10/396,569

(22) Filed: Mar. 26, 2003

(65) Prior Publication Data

US 2003/0184318 A1 Oct. 2, 2003

Related U.S. Application Data

(62) Division of application No. 09/608,152, filed on Jun. 30, 2000, now Pat. No. 6,563,328.

(30) Foreign Application Priority Data

Jul. 2, 1999 (FR) .......................................... 99 08606

(51) Int. Cl.⁷ .......................... G01R 27/26; G01F 23/26
(52) U.S. Cl. ...................... 324/663; 324/658; 73/304 C
(58) Field of Search ............................... 324/663, 658, 324/660, 446, 661, 664, 693, 695, 696, 760; 73/304 C

(56) References Cited

U.S. PATENT DOCUMENTS

| | | | |
|---|---|---|---|
| 3,433,072 A | | 3/1969 | Virtanen et al. |
| 3,569,824 A | | 3/1971 | Ruse |
| 3,891,465 A | * | 6/1975 | Muto et al. .................... 429/61 |
| 3,956,760 A | | 5/1976 | Edwards |
| 3,998,441 A | * | 12/1976 | Schuster et al. ............ 266/250 |
| 4,023,096 A | * | 5/1977 | Schmidt ..................... 324/663 |
| 4,054,744 A | * | 10/1977 | Beaman ...................... 174/151 |
| 4,112,197 A | * | 9/1978 | Metz ........................... 428/629 |
| 4,449,405 A | | 5/1984 | Franz et al. |
| 4,457,170 A | | 7/1984 | Thrift et al. |
| 5,212,992 A | | 5/1993 | Calhoun et al. |
| 5,315,872 A | | 5/1994 | Moser |
| 5,688,384 A | * | 11/1997 | Hodgson et al. ......... 204/228.2 |
| 5,907,112 A | * | 5/1999 | Queyquep .................. 73/866.5 |

FOREIGN PATENT DOCUMENTS

| | | |
|---|---|---|
| EP | 01 01 580 | 2/1984 |
| EP | 04 70 483 | 2/1992 |
| EP | 09 26 474 | 6/1999 |
| GB | 11 76 914 | 1/1970 |

OTHER PUBLICATIONS

"The Sixth International meeting on Chemical Sensors", Jul. 22–25, 1996, by Howard H. Weetall. NIST, Gaithersburg, MD, USA.*

* cited by examiner

Primary Examiner—David A. Zarneke
Assistant Examiner—Paresh Patel
(74) Attorney, Agent, or Firm—Antonelli, Terry, Stout & Kraus, LLP

(57) ABSTRACT

Capacitive probe measuring the level, in a vessel and with high precision, of the interface between a conducting fluid (F1) and a non-conducting fluid (a gas or oil for example), suited to work under high pressure and high temperature conditions. The probe comprises a preferably tubular insulating layer (3) made of a dielectric heat-resisting material (a metal oxide such as zirconia or alumina) baked at a high temperature, with a first face in contact with conducting fluid (Fl) and an opposite face in contact with a second electrode (4), consisting for example of a coating or of a layer made of a fusible alloy deposited on the opposite face of insulant (3), selected according to the temperature range within which the capacitive probe is intended to work, or possibly of an added tube. Alloys based on zinc, tin, copper, etc, can for example be used. A second capacitor of the same type used for temperature compensation of the first one can be placed within the tubular insulating layer. Its capacitance is for example of the order of 1 nF. The probe can be applied in laboratory apparatuses working under high pressure and high temperature conditions, notably in petrophysical test cells.

25 Claims, 1 Drawing Sheet

CAPACITIVE PROBE FOR MEASURING THE LEVEL OF AN ELECTRICITY-CONDUCTING LIQUID IN A VESSEL AND METHOD OF MANUFACTURING SUCH A PROBE

CROSS REFERENCE TO RELATED APPLICATION

This application is a Divisional application of and claims the benefit of the filing date of U.S. patent application Ser. No. 09/608,152, filed Jun. 30, 2000, now U.S. Pat. No. 6,563,328, entitled "Capacitive Probe for Measuring the Level of an Electricity-Conducting Liquid in a Vessel and Method of Manufacturing Such a Probe", which application is incorporated herein by reference in its entirety.

BACKGROUND OF THE INVENTION

1. Field of the Invention

The present invention relates to a capacitive probe for measuring the level of an electrically conductive liquid in a vessel, particularly suited for high pressure and high temperature applications, and a method of manufacturing such a probe.

2. Description of the Prior Art

Examples of well-known methods intended to measure the evolution of the level of a liquid in a vessel are optical methods according to which the progress of a float is monitored by automatic control through a transparent window provided vertically in the wall. This type of measurement is suited only for clean liquids which do not affect the transparency of the window.

There are also ultrasonic methods where the level of the liquid in a vessel is measured by measuring the time of propagation of pulses reflecting on the surface. This type of measurement works well even at relatively high pressures and temperatures as long as the interface between phases is clear, but it loses precision when the liquid is highly emulsified.

It is also well-known to detect the position of the interface between an electrically conductive liquid by means of a capacitive probe whose capacitance is affected by the level variation.

Such a probe comprises for example a central metallic rod sheathed with an insulating plastic material, applied for example by heat shrinkage, which dips into the conducting fluid. The variation of the inter-electrode capacitance between the sheathed rod and the conducting fluid, resulting from the level variation, is measured. A probe of this type is for example used in the device which is described in French Patent 2,772,477 of the Assignee.

There are also level-measuring capacitive probes made up of a first electrode consisting of the metallic wall of a vessel which is separated from the conducting liquid by an insulating layer made of, for example, Teflon™. It can be the wall of a tube made of an insulating plastic covering the inner metallic wall of the vessel or an insulating coating (enamel for example) evenly deposited on the inner face. The inter-electrode surface is here the surface of the inner wall of tube 1. A probe of this type is used for example in the device described in French Patent 2,782,804 of the Assignee.

The capacitive probes mentioned above however have some drawbacks. First of all, it is difficult to deposit a uniform and thin insulating layer on a metallic rod or wall. The probes generally work properly under normal temperature and pressure conditions, but they deteriorate very quickly in more difficult environments notably as a result of creep effects affecting the plastic sheaths. This degradation occurs even when the insulating sheaths or coatings are made of materials withstanding heat, such as enamels for example. Enamel contains bubbles and thermal stresses cause microcracks that are invaded by the conducting liquid. The dielectric constant of the sheath or of the coating can thus vary considerably according to whether the sheath is more or less saturated with the liquid, which of course distorts the measurement results.

SUMMARY OF THE INVENTION

The capacitive probe according to the invention allows continuous measurement of the level of a conducting fluid in a vessel with good precision, measurements being stable in time and reproducible, which allows overcoming the aforementioned drawbacks of the prior art.

The probe comprises a tubular element made from an electrically insulating material, with a first face in contact with the conducting fluid forming a first electrode, and an opposite face in contact with a second electrode, and a means for measuring the capacitance variations of the capacitor formed by the electrodes, the second electrode being made of a fusible light alloy deposited on the opposite face of the tubular element made of insulating material, whose melting temperature is selected according to the specified maximum temperature range within which the capacitive probe is intended to work.

For applications in a range of temperatures up to 200° C. for example, a lead/tin type alloy whose melting point is of the order of 300° C. can for example be selected.

The second electrode can be formed by filling the inner space of the tubular element with a fusible alloy whose melting temperature is selected according to the capacitive probe, or it can be cast between the inner face of the tubular element and a central core.

This central core can in some cases consist of a solid rod. The central core can however also have the shape of a tubular element made from the same heat-resisting material. Two capacitors fitted into each other can thus be formed by placing a third electrode into this hollow core made of heat-resisting material. As the capacitors are exposed to the same temperature, the inner capacitor can be used as a reference and thus allows compensation for the effects of temperature on the dielectric permittivity of the heat resisting material and therefore to compensate for the concomitant variations of the capacitive probe.

According to another embodiment, the insulating layer is annular and arranged in the vessel. It electrically insulates the wall of the vessel from the electrically conducting liquid contained therein. Similarly, the second electrode can be a coating or a layer of fusible metal cast between the heat-resisting layer and the outer wall.

Various metal oxides can be used as the heat-resisting material, such as zirconia or alumina which, unlike enamels, are practically insensitive to chemical and biological attack, and stable regarding pressure and temperature variations.

It can be easily checked that the capacitive probe according to the invention is well-suited to work within a wide temperature and pressure variation range because of the stability of each insulating layer as regards these parameters, and also because of the probe's perfect resistance to various corrodants, both chemical and biological.

The method of manufacturing the capacitive probe as defined above comprises making the insulating layer by baking a heat-resisting material such as a metal oxide (zirconia, alumina or others) and forming a metallic electrode obtained by fusion of a fusible alloy at an intermediate temperature between the baking temperature of the insulating layer and the maximum operating temperature of the capacitive probe.

BRIEF DESCRIPTION OF THE DRAWINGS

Other features and advantages of the probe according to the invention will be clear from reading the description hereafter of non limitative examples, with reference to the accompanying drawings wherein.

DETAILED DESCRIPTION OF THE PREFERRED EMBODIMENTS

Figure 1:
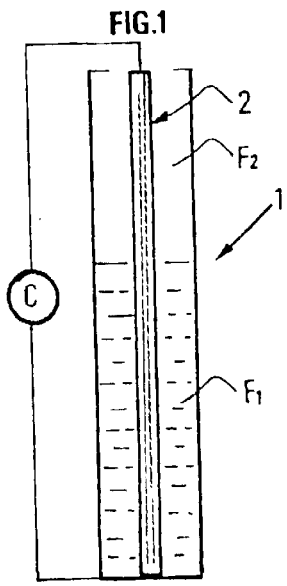
FIG. 1 diagrammatically shows, in longitudinal section, a first embodiment with a central rod forming a capacitor with the conducting fluid whose level is to be measured.

The capacitive probe according to the invention is suited to continuously measure the level of the interface between an electrically conductive fluid Fl (brine for example) and another, non-conducting fluid F2 (a gas or a liquid such as oil), contained in an elongate vessel 1 (FIG. 1), by determining the capacitance of the capacitor consisting of conducting fluid Fl (first electrode) and a central rod 2.

Figure 2:
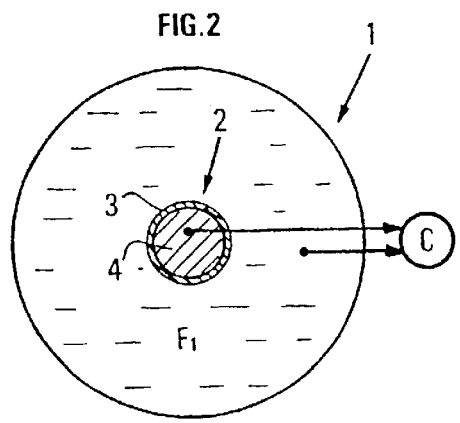
FIG. 2 shows, in cross section, greatly enlarged for clarity reasons, a first variant of the embodiment of FIG. 1.

This rod 2 comprises (FIG. 2) a tube 3 made of a heat-resisting dielectric material. This tube, obtained by moulding or extrusion, is baked at a high temperature (1000° to 2000° C. for example). Second electrode 4 is formed within insulating tube 3. It is preferably made by filling the inside of tube 3 with a fusible metal alloy so selected that its melting temperature is naturally well above the maximum operating temperature specified for the capacitive probe, while remaining greatly below the baking temperature of the heat-resisting material. An alloy based on metals such as zinc, tin, copper, etc, whose precise specifications can be found in metallurgists' catalogs, are for example used. The second electrode 4 in rod 2 and the conducting wall of the vessel (in electrical contact with conducting fluid F1) are respectively connected to the terminals of a capacitance meter C. The capacitance measured is directly proportional to the conducting liquid level in the vessel.

A metal oxide, such as zirconia or alumina, is advantageously used as the heat-resisting material. Zirconia notably affords the advantage of being insensitive both to chemical and biological attack. Unlike enamels which are commonly used, zirconia has a thermal expansion coefficient that is very close to that of metals, which allows central rod 2 to retain a very good cohesion whatever the operating temperature.

By way of example, it is possible to use a 1-cm diameter zirconia tube with a 0.5-mm thick wall and a length of 30 cm for example, whose capacitance is of the order of 1 nF, which can be readily measured.

In order to improve the cohesion of central rod 2, if the thermal expansion coefficient of electrode 4 made of alloy is different from that of ceramic tube 3, part of the volume of the alloy can be replaced by a stainless steel or Invar™ core for example (not shown) whose diameter is selected so as to better adjust the expansion coefficient of the assembly.

Figure 3:
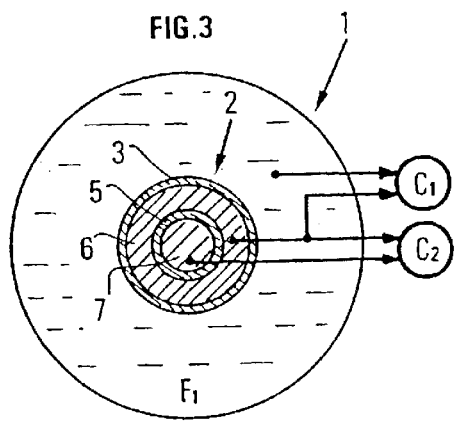
FIG. 3 shows, in cross section, also enlarged, a second variant of the embodiment of FIG. 1, FIG. 4 diagrammatically shows, in longitudinal section, a second embodiment comprising a tubular assembly forming a capacitor with the conducting fluid whose level is to be continuously measured and which is placed within.

According to the embodiment of FIG. 3, central rod 2 comprises two coaxial tubes 3, 5 made of a heat-resisting material. The annular space between the two tubes is filled with a conducting alloy 6 which forms the second electrode. Inner tube 5 is filled with a conducting alloy 7 forming the third electrode. It is essential to electrically insulate the third electrode from second electrode 6. Two capacitors are thus formed. The first capacitor, consisting of conducting wall 1 of the vessel (in electric contact with conducting fluid F1), insulating tube 3 and second electrode 6, is connected to a first capacitance meter C1. The second capacitor, consisting of second electrode 6, inner insulating tube 5 and third alloy electrode 7, is connected to a second capacitance meter C2.

Second central capacitor (5–7) is subjected to the same temperature as the first capacitor. The variations of the electric permitivity of dielectric tube 5 can thus be used to compensate for the concomitant variations of the first capacitor under the effect of the temperature, by combination of the measurements obtained by the two capacitance meters C1 and C2. This combined coaxial structure can also allow adjustment for the expansion coefficient more readily so that the central rod retains a good cohesion under the effect of the temperature variations, for example by judiciously selecting the alloys of the second and third electrodes.

Figure 4:
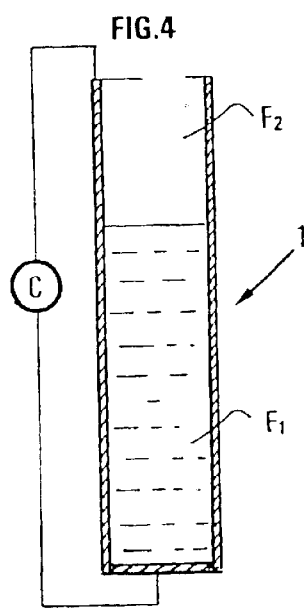
Figure 5:
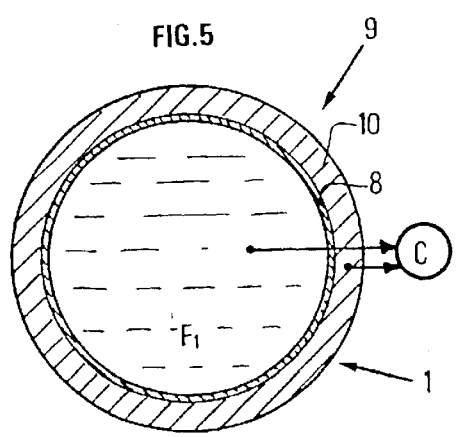
FIG. 5 shows, in cross section, also enlarged, the embodiment of FIG. 4.

According to the embodiment of FIGS. 4 and 5, the fluids are within a heat-resisting tube 8 and insulated thereby from a second external electrode 9 consisting either directly of the outer wall of enclosure 1 or preferably, as previously, of an annular volume 10 made of a fusible alloy, cast between the latter and tube 8. Similarly, conducting liquid F1 in insulating tube 8 on the one hand and the external electrode on the other hand are electrically connected to a capacitance meter C.

Embodiments where second electrode (4, 6 or 8) is advantageously formed by deposition of a fusible metal have been described. However, a tube of determined diameter allowing, once in place, close contact with the or with each insulating heat resisting layer (3 or 8) could also be used without departing from the scope of the invention.

What is claimed is:

1. A capacitive probe for measuring continuously a level, in a vessel, of an electrically conducive fluid, comprising:

a tubular element made of a heat resistant electrically insulating material with a first face in physical contact with the electrically conductive fluid, forming a first electrode, and an opposite face in physical contact with a second electrode, and a capacitance measuring device which continuously measures capacitance variations of the capacitor formed by the electrodes as the electrically conductive fluid changes level within the vessel; and wherein the second electrode is made of a fusible metal alloy having a melting temperature above a maximum temperature range at which the capacitive probe is intended to operate and the fusible metal alloy is cast against the opposite face of the tubular element.

2. A capacitive probe as claimed in claim 1, wherein:

the fusible metal alloy forming the second electrode is cast between the tubular element and a central solid rod.

3. A capacitive probe as claimed in claim 2, wherein the tubular element comprises:

a metal oxide.

4. A capacitive probe as claimed in claim 3, wherein:

the metal oxide comprises zirconia.

5. A capacitive probe as claimed in claim 3, wherein:

the metal oxide comprises alumina.

6. A capacitive probe as claimed in claim 1, wherein the tubular element comprises:

a metal oxide.

7. A capacitive probe as claimed in claim 6, wherein:

the metal oxide comprises zirconia.

8. A capacitive probe as claimed in claim 6, wherein:

the metal oxide comprises alumina.

9. A capacitive probe as claimed in claim 1 wherein:

the fusible metal alloy is cast within an inner volume of the tubular element.

10. A capacitive probe as claimed in claim 1 wherein:

the fusible metal alloy is cast between the tubular element and a conducting wall of the vessel.

11. A capacitive probe in accordance with claim 1 wherein:

the electrically insulating material comprises a ceramic.

12. A capacitive probe in accordance with claim 1 wherein:

the electrically insulating material comprises a refractory material.

13. A capacitive probe in accordance with claim 1 wherein:

the electrically insulating material comprises a metal oxide.

14. A capacitive probe for measuring continuously a level, in a vessel, of an electrically conductive fluid, comprising:

a tubular element made of a heat resistant electrically insulating material with a first face in physical contact with the electrically conductive fluid, forming a first electrode, and an opposite face in physical contact with a second electrode and a capacitance sensor which continuously measures capacitance variations of a capacitor formed by the electrodes as the electrically conductive fluid changes level within the vessel; and wherein the second electrode is made of a fusible metal alloy deposited on the opposite face of the tubular element made of the electrically insulating material, the alloy having a melting temperature above a maximum temperature range at which the capacitive probe is intended to operate and the fusible metal alloy contacts the opposite face of the tubular element.

15. A capacitive probe as claimed in claim 14, wherein:

the second electrode is formed by filling the inner space of tubular element with a fusible alloy.

16. A capacitive probe as claimed in claim 14, wherein:

the second electrode is cast between the inner face of tubular element and a central core.

17. A capacitive probe as claimed in claim 16, wherein:

the central core comprises a solid rod.

18. A capacitive probe as claimed in claim 14, wherein:

the second tubular element is within the vessel and electrically insulates a wall of the vessel from the electrically conductive fluid contained therein.

19. A capacitive probe as claimed in claim 18, wherein:

the second electrode is made of a fusible alloy having a melting temperature below the temperature used to form the tubular elements.

20. A capacitive probe as claimed in claim 19, wherein:

the tubular elements are made from a heat resistant material.

21. A capacitive probe as claimed in claim 14 wherein:

the fusible metal alloy is cast within an inner volume of the tubular element.

22. A capacitive probe as claimed in claim 14 wherein:

the fusible metal alloy is cast between the tubular element and a conducting wall of the vessel.

23. A capacitive probe in accordance with claim 14 wherein:

the electrically insulating material comprises a ceramic.

24. A capacitive probe in accordance with claim 14 wherein:

the electrically insulating material comprises a refractory material.

25. A capacitive probe in accordance with claim 14 wherein:

the electrically insulating material comprises a metal oxide.

* * * * *